R. F. BOWER.
ROLLER BEARING.
APPLICATION FILED OCT. 20, 1910.
1,163,884.
Patented Dec. 14, 1915.
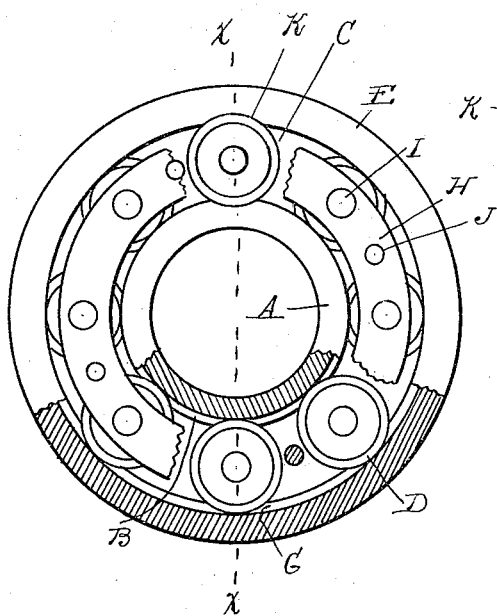
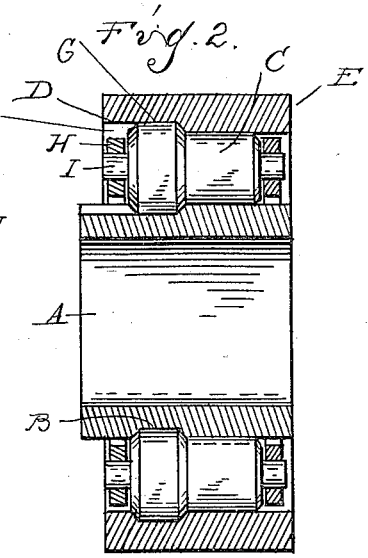

UNITED STATES PATENT OFFICE.

ROBERT F. BOWER, OF DAYTON, OHIO, ASSIGNOR TO BOWER ROLLER BEARING COMPANY, OF DETROIT, MICHIGAN, A CORPORATION OF MICHIGAN.

ROLLER-BEARING.

1,163,884.  Specification of Letters Patent.  Patented Dec. 14, 1915.

Application filed October 20, 1910. Serial No. 588,096.

*To all whom it may concern:*

Be it known that I, ROBERT F. BOWER, a citizen of the United States of America, residing at Dayton, in the county of Montgomery and State of Ohio, have invented certain new and useful Improvements in Roller-Bearings, of which the following is a specification, reference being had therein to the accompanying drawings.

The invention relates to roller bearings and consists in the construction as hereinafter set forth.

In the drawings,—Figure 1 is a sectional side elevation of the bearing; Fig. 2 is a longitudinal section therethrough on line $x$—$x$ Fig. 1.

My improved construction relates to roller bearings adapted to receive end thrust in opposite directions and it is the particular object of the invention to obtain a simple construction of parts that may be readily assembled.

As shown A is an inner sleeve or bearing member adapted to fit upon the spindle, shaft axle, or other member to which the bearing is attached.

B is a bevel faced groove formed around the outer face of the member A, and C are a series of rolls having bevel faced enlargements D for engaging said groove.

E is an outer annular bearing member surrounding the rolls C and forming a bearing for the cylindrical portions thereof.

G is a bevel face groove in the member E for receiving the enlargements D of the rolls.

H are rings at opposite ends of the rolls apertured to form bearings for pintles I, and J are cross ties for securing said rings in fixed relation and together therewith forming a cage for holding the rolls in properly spaced relation.

With the construction as thus far described it will be obvious that the rolls when once in engagement with the members A and E and having the enlargements D engaging the grooves B and G will hold said bearings from relative endwise movement. It would however, be impossible to assemble such a structure, as the enlargements of the rolls could not be engaged with the grooves of both the members A and E. I have therefore provided a simple means of assembling the parts consisting of entering slots extending laterally into the grooves B and G and of sufficient size to permit the endwise movement of the enlargement of one roll into said grooves. With this construction the parts may be assembled by inserting the rolls one at a time between the members A and E, the enlargements D passing through said entering slots K. When thus engaged each roll may be moved around between the inner and outer members providing space for the insertion of one roll until the series is complete. The rings H are then engaged with the pintles I and are secured together by the cross ties J after which all of the rolls are held properly spaced and prevented from disengagement from the members A and E.

What I claim as my invention is:

1. A roller bearing comprising inner and outer concentrically arranged parallel annular race members, one of said members being provided with an annular groove adjacent to one edge thereof and having an entering slot extending thereinto from said edge, and a series of rolls between said race members each having a parallel cylindrical portion and an enlargement at one end thereof, said enlargement being insertible through said entering slot into engagement with said annular groove, and the parallel portion lying between the uninterrupted annular portions of said race members.

2. A roller bearing comprising inner and outer concentrically arranged parallel annular race members, one of said members being provided with an annular groove therein having a beveled face adjacent to one edge thereof and an entering slot extending to said groove from said edge, a series of rolls between said race members each having a cylindrical parallel portion and a beveled faced enlargement, said enlargement being insertible through said entering slot into engagement with said annular groove and the parallel portion lying between the uninterrupted annular portions of said race members, and a cage engaging the series of rolls and holding the same from disengagement through said entering slot.

3. A roller bearing comprising inner and outer concentrically arranged annular race members, one of which has an annular groove therein to one side of its center and an entering slot from the outer edge into said groove, which said edge projects beyond the outer edge of the coöperating race member, a series of rolls between said race members each having a cylindrical portion extending from its inner end to a point adjacent its otuer end and an enlargement at said outer end, said enlargement being insertible through said entering slot into engagement with said annular groove, and the cylindrical portion lying between the continuous and uninterrupted portions of the race members.

In testimony whereof I affix my signature in presence of two witnesses.

ROBERT F. BOWER.

Witnesses:
W. J. BELKNAP,
JAMES P. BARRY.

Copies of this patent may be obtained for five cents each, by addressing the "Commissioner of Patents, Washington, D. C."